United States Patent
Kalaboukis

(10) Patent No.: US 10,853,775 B1
(45) Date of Patent: Dec. 1, 2020

(54) COMPUTING SYSTEMS FOR PROXIMITY-BASED FEES

(71) Applicant: Wells Fargo Bank, N.A., San Francisco, CA (US)

(72) Inventor: Chris Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 497 days.

(21) Appl. No.: 15/394,465

(22) Filed: Dec. 29, 2016

(51) Int. Cl.
G06Q 20/10 (2012.01)
H04W 4/02 (2018.01)
G06Q 30/02 (2012.01)

(52) U.S. Cl.
CPC ....... *G06Q 20/102* (2013.01); *G06Q 30/0283* (2013.01); *H04W 4/023* (2013.01)

(58) Field of Classification Search
CPC .. G06Q 20/102; G06Q 30/0283; G06Q 20/10; G06Q 30/02; H04W 4/023; H04W 4/02
See application file for complete search history.

(56) References Cited

U.S. PATENT DOCUMENTS

| | | | | |
|---|---|---|---|---|
| 4,931,865 | A * | 6/1990 | Scarampi | A61B 3/113 348/E7.07 |
| 6,539,100 | B1 * | 3/2003 | Amir | G06F 3/011 382/117 |
| 7,216,109 | B1 * | 5/2007 | Donner | G06Q 10/02 235/382 |
| 8,676,615 | B2 | 3/2014 | Callaghan et al. | |
| 8,775,807 | B1 * | 7/2014 | Vazquez | G06F 21/31 713/168 |
| 8,879,155 | B1 * | 11/2014 | Teller | G06K 9/00604 359/630 |
| 9,111,383 | B2 | 8/2015 | Fein et al. | |
| 9,154,303 | B1 * | 10/2015 | Saylor | H04L 63/08 |
| 9,183,551 | B2 * | 11/2015 | Nuzzi | G06Q 20/0457 |
| 9,363,569 | B1 * | 6/2016 | van Hoff | G06Q 30/0263 |
| 9,576,255 | B2 * | 2/2017 | Kalb | H04W 12/08 |
| 9,600,069 | B2 * | 3/2017 | Publicover | G06F 3/013 |
| 9,813,825 | B2 * | 11/2017 | Bjelosevic | G01S 13/06 |
| 9,886,569 | B1 * | 2/2018 | Vazquez | G06F 21/31 |
| 9,892,374 | B2 * | 2/2018 | Kneece | G06Q 50/01 |
| 9,911,260 | B2 * | 3/2018 | DeLuca | G07C 9/27 |
| 10,223,710 | B2 * | 3/2019 | Purves | G06Q 30/0261 |

(Continued)

FOREIGN PATENT DOCUMENTS

WO 2016007961 A1 1/2016

OTHER PUBLICATIONS

Christine Connolly, "Technological improvements in position sensing," 2007, Emerald Group Publishing, vol. 27, No. 1, pp. 17-23. (Year: 2007).*

(Continued)

*Primary Examiner* — Kenneth Bartley
(74) *Attorney, Agent, or Firm* — Shumaker & Sieffert, P.A.

(57) ABSTRACT

In an example, a method includes determining, by a computing device, a proximity of a user to a point of interest. The method also includes determining, by the computing device, a fee to the user based on the proximity of the user to the point of interest, where the fee varies based on the proximity of the user to the point of interest. The method also includes initiating, by the computing device, an electronic transaction based on the fee.

16 Claims, 7 Drawing Sheets

(56) References Cited

U.S. PATENT DOCUMENTS

| | | | | |
|---|---|---|---|---|
| 10,299,189 B2* | 5/2019 | Scarborough | G06Q 30/0639 | |
| 10,527,431 B2* | 1/2020 | Xu | H04W 4/024 | |
| 2003/0084005 A1* | 5/2003 | Wong | G06Q 30/0283 | 705/400 |
| 2004/0006497 A1* | 1/2004 | Nestor | G06Q 10/02 | 705/5 |
| 2007/0055554 A1* | 3/2007 | Sussman | G06Q 10/02 | 705/5 |
| 2007/0162301 A1* | 7/2007 | Sussman | G06Q 10/02 | 705/5 |
| 2007/0225911 A1* | 9/2007 | Chanick | G01C 21/20 | 701/469 |
| 2009/0157566 A1* | 6/2009 | Grush | G01C 21/28 | 705/400 |
| 2009/0276364 A1* | 11/2009 | Iaia | G06Q 10/02 | 705/80 |
| 2009/0319306 A1* | 12/2009 | Chanick | G01C 21/3679 | 705/5 |
| 2010/0070988 A1* | 3/2010 | Cohen | G06K 9/00778 | 725/10 |
| 2010/0082491 A1* | 4/2010 | Rosenblatt | G06Q 10/02 | 705/65 |
| 2010/0106263 A1* | 4/2010 | Charania | G06Q 10/04 | 700/36 |
| 2010/0162285 A1* | 6/2010 | Cohen | H04N 21/42201 | 725/12 |
| 2010/0191631 A1* | 7/2010 | Weidmann | H04N 7/17318 | 705/34 |
| 2010/0324972 A1* | 12/2010 | Brooke | G06Q 30/02 | 705/26.3 |
| 2011/0040691 A1* | 2/2011 | Martinez | G06Q 20/3224 | 705/80 |
| 2011/0173032 A1* | 7/2011 | Payne | G06Q 10/02 | 705/5 |
| 2011/0187505 A1* | 8/2011 | Faith | G06F 1/1694 | 340/10.1 |
| 2011/0295722 A1* | 12/2011 | Reisman | G06Q 30/0201 | 705/27.1 |
| 2012/0078667 A1* | 3/2012 | Denker | G06Q 10/02 | 705/5 |
| 2012/0190386 A1* | 7/2012 | Anderson | G01C 15/04 | 455/456.3 |
| 2012/0316963 A1* | 12/2012 | Moshfeghi | G06Q 20/20 | 705/14.58 |
| 2012/0320013 A1* | 12/2012 | Perez | H04N 5/91 | 345/207 |
| 2013/0030871 A1* | 1/2013 | Schwitzky | G06Q 30/02 | 705/7.35 |
| 2013/0030964 A1* | 1/2013 | Nuzzi | G06Q 30/04 | 705/30 |
| 2013/0085834 A1* | 4/2013 | Witherspoon, Jr. | G06Q 30/02 | 705/14.32 |
| 2013/0096961 A1* | 4/2013 | Owens | G06Q 10/02 | 705/5 |
| 2013/0151295 A1* | 6/2013 | Denker | G06Q 10/02 | 705/5 |
| 2013/0151687 A1* | 6/2013 | Mooneyham | G06Q 30/02 | 709/224 |
| 2013/0159030 A1* | 6/2013 | Tattenbaum | G06Q 10/02 | 705/5 |
| 2013/0159031 A1* | 6/2013 | Sunshine | G06Q 10/02 | 705/5 |
| 2013/0268406 A1* | 10/2013 | Radhakrishnan | G06Q 30/0283 | 705/26.61 |
| 2013/0324880 A1* | 12/2013 | Adachi | A61B 5/7203 | 600/545 |
| 2014/0053173 A1* | 2/2014 | Oh | H04N 21/44218 | 725/12 |
| 2014/0195277 A1* | 7/2014 | Kim | G06Q 10/02 | 705/5 |
| 2014/0274388 A1* | 9/2014 | Nguyen | G07F 17/3206 | 463/31 |
| 2014/0278592 A1 | 9/2014 | Giampapa | | |
| 2015/0154571 A1 | 6/2015 | Zamer | | |
| 2015/0161525 A1* | 6/2015 | Hirose | G06Q 10/02 | 705/5 |
| 2015/0181303 A1* | 6/2015 | Amano | H04N 21/47815 | 725/34 |
| 2015/0199729 A1 | 7/2015 | Saccoman | | |
| 2015/0199730 A1* | 7/2015 | Soon-Shiong | G06Q 30/0269 | 705/14.66 |
| 2015/0227969 A1 | 8/2015 | Hanly | | |
| 2015/0242763 A1* | 8/2015 | Zamer | G06Q 10/02 | 705/5 |
| 2015/0242888 A1 | 8/2015 | Zises | | |
| 2015/0281774 A1* | 10/2015 | Atkin | H04N 21/64322 | 725/14 |
| 2015/0287119 A1* | 10/2015 | Bhan | G06Q 30/0629 | 705/5 |
| 2016/0071325 A1 | 3/2016 | Callaghan | | |
| 2016/0080390 A1* | 3/2016 | Kalb | H04W 12/08 | 726/4 |
| 2016/0171540 A1* | 6/2016 | Mangipudi | G06Q 30/0255 | 705/14.53 |
| 2016/0171783 A1 | 6/2016 | Hamilton, II et al. | | |
| 2016/0321687 A1* | 11/2016 | Howe | G06Q 30/0206 | |
| 2016/0328698 A1* | 11/2016 | Kumaraguruparan | H04W 4/029 | |
| 2017/0075421 A1* | 3/2017 | Na | G06F 3/013 | |
| 2017/0237820 A1* | 8/2017 | Scarborough | G06Q 10/00 | 709/226 |
| 2017/0337480 A1* | 11/2017 | Yin | G06N 5/048 | |
| 2017/0364836 A1* | 12/2017 | Li | G06Q 10/02 | |
| 2018/0211718 A1* | 7/2018 | Heath | G16H 10/65 | |

OTHER PUBLICATIONS

Horwitz, "Location-based apps hit the streets, the seats and everywhere else," Tech Target, accessed from http://searchcrm.techtarget.com/feature/Location-based-apps-hit-the-streets-the-seats-and-everywhere-else, Oct. 8, 2015, 4 pages.

Linendoll, "Move to better seats with Pogoseat app," ESPN, accessed from http://searchcrm.techtarget.com/feature/Location-based-apps-hit-the-streets-the-seats-and-everywhere-else, Nov. 15, 2012, 2 pages.

Stone, "Don't Like Your Seat? Baseball Fans Can Now Upgrade, Mid-Game," Bloomberg, accessed from http://www.bloomberg.com/news/articles/2013-03-13/dont-like-your-seat-baseball-fans-can-now-upgrade-mid-game, Mar. 13, 2013, 3 pages.

* cited by examiner

COMPUTING SYSTEMS FOR PROXIMITY-BASED FEES

FIELD

Aspects of this disclosure generally relate to electronic monitoring and fee assessment.

BACKGROUND

A venue operator may change a fee for access to certain points of interest. For example, a gallery owner may charge an admission fee for access to view works of art in the gallery. Likewise, a sporting event operator may charge a fee for a seat to watch the sporting event. In general, such fees are pre-paid. For example, the gallery operator may charge a general admission fee before a customer is allowed entrance to the gallery, or the sporting event operator may charge the customer in advance for a ticket that permits the customer to access a particular seat at the event.

SUMMARY

The techniques of this disclosure relate to electronically monitoring the movement of a customer with respect to a point of interest and determining a fee that is based on such movement without the need to pre-pay. For example, according to aspects of this disclosure, one or more electronic sensors may be used to track a relative position of a user with respect to a point of interest in real-time or near-real time as the user views the point of interest. In some examples, one or more sensors may also be used to track the actual view of the user, e.g., using sensors to track the head and/or eye position of the user. A system may determine a proximity of a user to a point of interest and determine a fee based on the determined proximity. After determining the fee, the techniques also include initiating an electronic transaction to settle the determined fee.

In one example, a method includes determining, by a computing device, a proximity of a user to a point of interest; determining, by the computing device, a fee to the user based on the proximity of the user to the point of interest, wherein the fee varies based on a change to the proximity of the user to the point of interest; and initiating, by the computing device, an electronic transaction based on the fee.

In another example, an apparatus includes a memory configured to store a proximity of a user to a point of interest; and one or more processors configured to determine a fee to the user based on the proximity of the user to the point of interest, wherein the fee varies based on a change to the proximity of the user to the point of interest; and initiate an electronic transaction based on the fee.

In another example, a non-transitory computer-readable medium has instructions stored thereon that, when executed, cause one or more processors to determine a proximity of a user to a point of interest; determine a fee to the user based on the proximity of the user to the point of interest, wherein the fee varies based on a change to the proximity of the user to the point of interest; and initiate an electronic transaction based on the fee.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
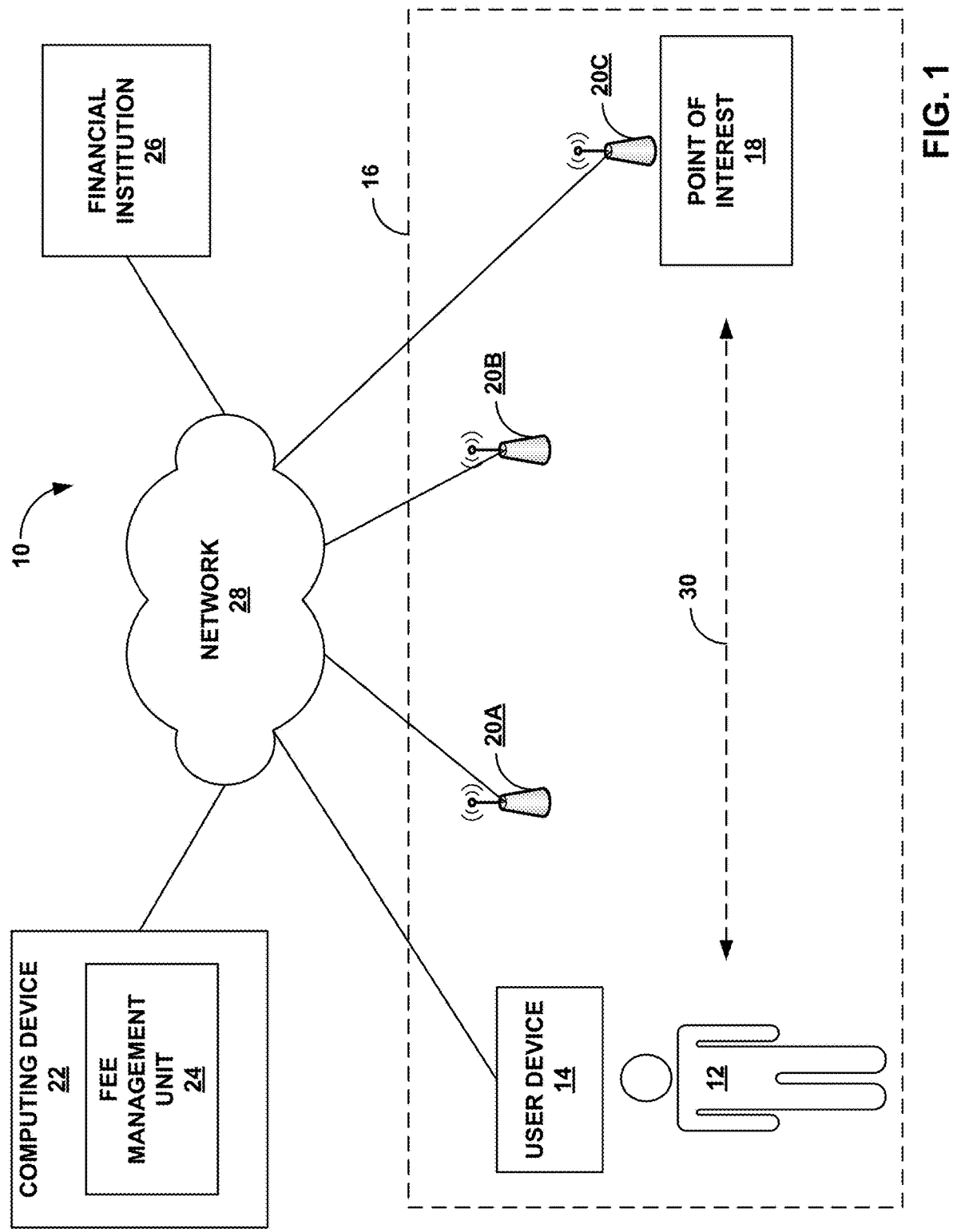
FIG. 1 is a block diagram illustrating an example computing system for determining a fee based on a proximity to a point of interest in accordance with one or more aspects of the present disclosure.

Techniques of this disclosure allow a fee to be charged to a user (e.g., a customer) based on the user's proximity to a point of interest. As described herein, a point of interest may be any person, place or thing for which a user may be willing to pay a fee for access. For example, a point of interest may be a work of art (e.g., a painting), an event (e.g., a sporting event), a person (e.g., a performance), a historical monument, or a wide variety of other people, places, or things for which a user may be willing to pay a fee to view. In addition, as described herein, proximity is the nearness of the user to the point of interest (e.g., proximity increases as the user moves toward the point of interest).

Traditionally, there has not been an efficient way to track a user relative to a point of interest in order to determine the experience of the user and charge a fee based on that experience. For example, a user typically pre-pays a fee for admission to a specific location, e.g., a general admission fee for access to an entire art gallery or a seat fee for access to a specific seat in a venue. However, in the example of the general admission fee, the user may only be interested in one or two pieces in the gallery, or the gallery operator may wish to charge a premium for a special show-within-a-show. At a concert or a sporting event, as other examples, after a show or event begins, a user may move into an empty seat that may provide a better experience and be more expensive than the user's paid seat. In these examples, conventional entrance or seat fees may not reflect the experience actually incurred by the customer. In addition, security guards, barricades, or other restraints may be used to prevent users from accessing areas for which the user has not paid the appropriate fee.

The techniques of this disclosure may, in some instances, include electronically tracking a user relative to a point of interest in real-time or near real-time for the purpose of assessing a fee to the user. For example, certain techniques described in this disclosure may provide a manner in which to determine proximity and/or other characteristics of a user relative to a point of interest, determine a fee based on the proximity and/or other characteristics, and initiate an electronic transaction to settle the fee.

The fee may vary with the proximity such that the user is charged more or less based on the proximity. For example, the fee may increase as a user moves closer to the point of interest, which may result in a better experience for the user. In some instances, the fee may decrease if the user moves too close to the point of interest or the user's view becomes obstructed (e.g., resulting in a reduced experience). In this way, the techniques may provide a technological enhancement to the manner in which fees are determined, such that a customer is assessed an experience-based fee in a manner that obviates the need for restraining a user from access to an experience for which the user has not pre-paid.

For example, according to aspects of this disclosure, a computing system may track whether a customer is within a specific radius of a location, using a plurality of sensors, in order to determine whether the customer is viewing a point of interest. Additionally or alternatively, the computing system may determine a view of the user relative to the point of interest based on a determination of a user's visual range of view, e.g., using cameras (computer vision), eye tracking sensors, augmented reality glasses, or the like. In response to determining that the customer is viewing the point of interest or is in a specific location, the user is charged a specific amount for being in that location and viewing that point of interest. In some examples, the fee assessed may be time-based (e.g., per second, per minute, per hour, or the like), such that the longer the user spends in proximity to and viewing the point of interest, the higher the assessed fee. After the user is no longer viewing the point of interest, a fee is no longer assessed or accumulated. In some examples, such "micro fees" (e.g., relative to a general admission fee) may be charged and settled via electronic transactions.

FIG. 1 is a block diagram illustrating an example computing system 10 for determining a fee based on a proximity to a point of interest in accordance with one or more aspects of the present disclosure. The example of FIG. 1 includes a user 12 having a user computing device ("user device") 14 that is located within an environment 16 that includes a point of interest 18 and a plurality of beacons 20A-20C (collectively, beacons 20). The system also includes a computing device 22 having a fee management unit 24, and a financial institution 26. The components of computing system 10 may be connected via network 28.

User device 14 may be a variety of electronic devices that allow a user to communicate with computing device 22 and/or financial institution 26 via network 28. For example, user device 12 may be a portable or mobile device such as a cellular phone or another wireless communication device, laptop or desktop computers, tablet computers, so-called "smart" phones, "smart" pads, "smart" watches, "smart" glasses" or other personal digital appliances equipped for wired or wireless communication. User device 14 may include at least one user interface device (not shown) that enables a customer to interact with user device 14. In general, the functionality of user device 14 may be implemented in a device that includes one or more processing units, such as one or more microprocessors. The functionality of user device 14 may be implemented in hardware or in a combination of software and hardware, where requisite hardware may be provided to store and execute software instructions. Such hardware may include, for example, a processing unit and a computer-readable storage medium.

Environment 16 represents any pre-defined area that includes point of interest 18. For example, environment 16 may be a particular venue (or portion thereof) that includes point of interest 18. Non-limiting examples of environment 16 may include a museum, an art gallery, a sports facility, a concert hall, or the like. Environment 16 may be inside or outdoors. In some examples, environment 16 may be secured from unauthorized entry.

Point of interest 18 may be any person, place or thing for which user 12 is willing to pay a fee for access. For example, point of interest 18 may be a work of art (e.g., a painting), an event (e.g., a sporting event), a person (e.g., a performance), a historical monument, or a wide variety of other people, places, or things for which a user may be willing to pay a fee to view. While described in the singular, in some examples, point of interest 18 may have more than one component, e.g., a collection of people, places, or things.

Beacons 20 may provide location information within environment 16. For example, beacons 20 may use wireless signals to determine the location of user device 14 (thereby providing an indication of the location of user 12) within environment 16. As examples, beacons 20 may be enabled with Global Positioning System (GPS), WiFi, and/or other wireless technologies to determine location information. In an example for purposes of illustration, beacons 20 may determine the location of user device 14 by communicating directly with user device 14 and triangulating the position of user device 14 within environment 16. In another example, beacons 20 may receive location data from user device 14 (e.g., GPS data generated by user device 14) and determine the location of user device 14 based on the received data.

In some examples, beacons 20 may be positioned throughout environment 16. In such examples, beacons 20 may be used to determine the absolute location (e.g., geo-location) of user device 16 within venue. As described in greater detail below, the absolute location may be compared to a known location of point of interest 18 in order to determine proximity of user device 14 to point of interest 18. In another example, beacons 20 may be positioned at or near point of interest 18. In such an example, data indicating proximity to one or more of beacons 20 that are located at or near point of interest 18 may also indicate proximity of user device 14 to point of interest.

Computing device 22 may be operated by a party that controls access to environment 16 and collects fees based on viewing point of interest 18. Computing device 22 may include a variety of devices for processing and/or manipulating data. For example, in general, the functionality of computing device 22 may be implemented in a device that includes one or more processing units, such as one or more microprocessors. The functionality of computing device 22 may be implemented in hardware or in a combination of software and hardware, where requisite hardware may be provided to store and execute software instructions. Such hardware may include, for example, a processing unit and a computer-readable storage medium. Other hardware may include digital signal processors (DSPs), application specific integrated circuits (ASICs), field programmable gate arrays (FPGAs), or any other equivalent integrated or discrete logic circuitry, as well as any combinations of such components. While shown as a single computing device in the example of FIG. 1 for purposes of illustration, in some examples, computing device 22 may include or participate in a distributed network of computing devices including one or more databases, servers, and/or other computing devices.

Fee management unit 24 may include instructions executed by one or more processors of computing device 22 to perform the functions described with respect to fee management unit 24. As described in greater detail below, fee management unit 24 may determine a fee to be charged to user 12 based on a determined proximity 30 of user 12 to point of interest 18.

Financial institution 26 may represent a variety of different entities that offer banking products, such as checking accounts, savings accounts, and credit accounts; and different lending products, such as home loans, car loans, business loans, student loans, and the like. In some examples, user device 14 may initiate transactions with financial institution 26, such as deposits, withdrawals, and/or payments to and from a financial account associated with user 12. For example, user device 14 may execute a mobile banking application in order to settle payment of a fee determined by fee management unit 24 using funds held by financial institution 26.

Network 28 may include one or more private networks, such as private networks associated with environment 16 or financial institution 26, or may include a public network, such as the Internet. Although illustrated as a single entity, network 28 may comprise any combination of public and/or private telecommunications networks, and any combination of computer or data networks and wired or wireless telephone networks. In some examples, network 28 may comprise one or more of a wide area network (WAN) (e.g., the Internet), a virtual private network (VPN), a LAN, a WLAN (e.g., a Wi-Fi network), a wireless personal area network (WPAN) (e.g., a Bluetooth® network), or the public switched telephone network (PTSN).

According to aspects of this disclosure, system 10 may provide a technological enhancement to the manner in which fees for viewing point of interest 18 are determined and settled. For example, according to aspects of this disclosure, user 12 may carry or wear user device 14 into environment 16. User 12 may register user device 14 with fee management service 24, so that fee management service 24 is able to identify user device 14 as user 12 moves within environment 16. In one example, user 12 may be prompted to download an application executed by user device 14 before or upon entering environment 16, and user 12 may register user device 14 with fee management service 24 using the downloaded application.

Fee management unit 24 may determine proximity 30 of user device 14 to point of interest 18 while user 12 remains in environment 16. Fee management unit 24 may determine proximity throughout the time during which user 12 remains in environment 16, or at various intervals (e.g., every 30 seconds, every minute, every five minutes, or the like). In this way, fee management unit 24 may determine proximity 30 in real-time or near real-time (e.g., with communication and/or processing delays).

In order to determine proximity 30, fee management unit 24 may receive location data from user device 14 and determine proximity 30 based on the location data and the location of point of interest 18. In an example, user device 14 may determine the geolocation of user device 14 (e.g., using GPS or other techniques) and transmit location data directly to fee management unit 24 via network 28. The location of point of interest 18 may be fixed and stored by computing device 22 or may be transmitted to computing device 22 by point of interest 18 or one of beacons 20 (such as beacon 20C). In this example, fee management unit 24 may determine proximity 30 by determining the distance between the location of user device 14 (e.g., as indicated by the data received from user device 14) and the location of point of interest 18.

In another example, one or more of beacons 20 may be responsible for determining a location of user device 14 and/or point of interest 18. For example, user device 14 may determine a relative location of user device 14 and transmit data that indicates the location to beacons 20, which relay the data to fee management unit 24. In another example, user device 14 may simply maintain a communication channel with one or more of beacons 20, and beacons 20 may be responsible for determining the location of user device 14 and transmitting data that indicates the determined location to fee management unit 24. In these examples, fee management unit 24 may determine proximity 30 based on data received from beacons 20 that indicates the location of user device 14. That is, fee management unit 24 may determine proximity 30 by determining the distance between the location of user device 14 (e.g., as indicated by the data received from one or more of beacons 20) and the location of point of interest 18.

According to aspects of this disclosure, fee management unit 24 may determine a fee to user 12 based on proximity 30 of user 12 to point of interest 18, where the fee varies based on proximity 30 of user 12 to point of interest 18. For example, fee management unit 24 may increase the fee as proximity 30 of user 12 to point of interest 18 increases. Likewise, fee management unit 24 may decrease the fee as proximity 30 of user 12 to point of interest 18 decreases. Other relationships between proximity 30 and the manner in which the fee varies are also possible. For example, in some instances, fee management unit 24 may decrease the fee as proximity 30 of user 12 to point of interest 18 increases, e.g., in instances in which user experience may be degraded by proximity 30 that is too close to point of interest 18.

In some examples, fee management unit 24 may determine the proximity-based fee as a function of time. For example, fee management unit 24 may determine a fee per-second, per-minute, per-hour, or the like. In this example, fee management unit 24 may continue to accumulate the fee to be charged to user 12 based on proximity 30 for as long as user 12 maintains proximity 30. If the user 12 changes proximity 30, fee management unit 24 may continue to accumulate the fee to be charged to user 12 based on the changed proximity.

In a non-limiting example for purposes of illustration, proximity 30 of user 12 to point of interest 18 may be 10 feet, and fee management unit 24 may assess a two dollar charge to user 12 for every minute that user 12 maintains the ten foot distance. If user 12 decreases proximity 30 by moving away from point of interest 18, e.g., to 15 feet, fee management unit 24 may assess a lower, one dollar charge per minute. If user 12 increases proximity 30 by moving toward point of interest 18, e.g., to 5 feet, fee management unit 24 may assess a higher, three dollar charge per minute. Fee management unit 24 may continue to determine and accrue the fee until user 12 moves a predetermined distance away from point of interest 18 (e.g., exits environment 16) or a fee cap has been reached. The distances, fees and times in the example above are merely for purposes of illustration.

In some examples, fee management unit 24 may additionally or alternatively determine whether user 12 is viewing point of interest 18 and determine the fee based on whether user 12 is viewing the point of interest. For example, in some instances, user 12 may be positioned within environment 16 but may view point of interest 18 from an angle (e.g., versus having a direct line of sight). In other instances, user 12 may have an obstructed view of point of interest 18. According to aspects of this disclosure, fee management unit 24 may determine the fee based on the view of user 12, such that the fee varies based on a perceived quality of a view of user 12. For example, fee management unit 24 may assess a relatively higher fee for a direct and/or unobstructed view of point of interest 18 and may assess a relatively lower fee for an angled view and/or obstructed view of point of interest 18.

Fee management unit 24 may determine the view of user 12 relative to point of interest 18 in a variety of manners. In some examples, one or more cameras may be positioned in environment 16 (e.g., such as being incorporated in beacons 20). The one or more cameras may provide images to fee management unit 24, which may use the images to determine the direction user 12 is looking, e.g., based on a head or eye position of the user. In other examples, user device 12 may incorporate head and/or eye tracking components to determine the direction in which user 12 is looking relative to point of interest 18. User device 12 (or beacons 20) may transmit the direction data to fee management unit 24, and fee management unit 24 may determine the view of user 12 based on the received direction data. In other examples, user device 12 may be responsible for determining the view of user 12 relative to point of interest 18, which fee management unit 24 may directly use to determine the fee. In still other examples, one or more other components positioned within environment 16 (e.g., such as one or more cameras (not shown)) may be responsible for determining the direction in which user 12 is looking and/or the view of user 12 and transmitting an indication of the direction and/or view to fee management unit 24.

In this way, fee management unit 24 may determine a fee to user 12 based on proximity 30 and/or a determined view of user 12 with respect to point of interest 18. In instances in which fees are duration-based, fee management unit 24 may continue to assess the fee while user 12 is located within proximity 30 and/or is viewing point of interest 18. Fee management unit 24 may stop accruing the fee upon determining that user 12 has moved a predetermined distance from point of interest 18, upon determining that user 12 is no longer viewing point of interest, or upon user 12 exiting environment 16.

According to aspects of this disclosure, fee management unit 24 may also initiate an electronic transaction based on the determined fee. For example, as noted above, user 12 may register user device 14 with fee management service 24, so that fee management service 24 is able to identify user device 14 as user 12 moves within environment 16. In addition, user 12 may register a financial account of user 12 held by financial institution 26 with fee management service 24. User 12 may also provide other information or preferences that create a user profile including information that allows electronic transactions to be carried out. In this example, fee management unit 24 may initiate an electronic transaction to settle the determined fee using funds from the financial account of user.

In some examples, fee management unit 24 may automatically initiate the electronic transaction based on one or more events occurring. For example, fee management unit 24 may automatically initiate the electronic transaction upon determining that proximity 30 is less than a predetermined threshold (e.g., user 12 is a predetermined distance from point of interest 18). In another example, fee management unit 24 may automatically initiate the electronic transaction upon determining that user 12 has exited environment 16. In still another example, fee management unit 24 may automatically initiate the electronic transaction upon the fee reaching a predetermined threshold amount, e.g., such as a user-defined fee limit.

While certain functions are ascribed to particular components of system 10 in the example of FIG. 1 above, it should be understood that the techniques of this disclosure are not limited in this way. For example, while fee management unit 24 is described above as being responsible for determining proximity 30, in other examples, user device 14 may perform that function. That is, user device 14 may determine the location of user device 14 with respect to point of interest 18 and may upload an indication of proximity 30 to fee management unit 24. Other examples are also possible. For example, one or more of beacons 20 may be responsible for determining proximity 30 and determining the fee based on proximity or relaying the determined proximity to fee management unit 24.

Figure 2:
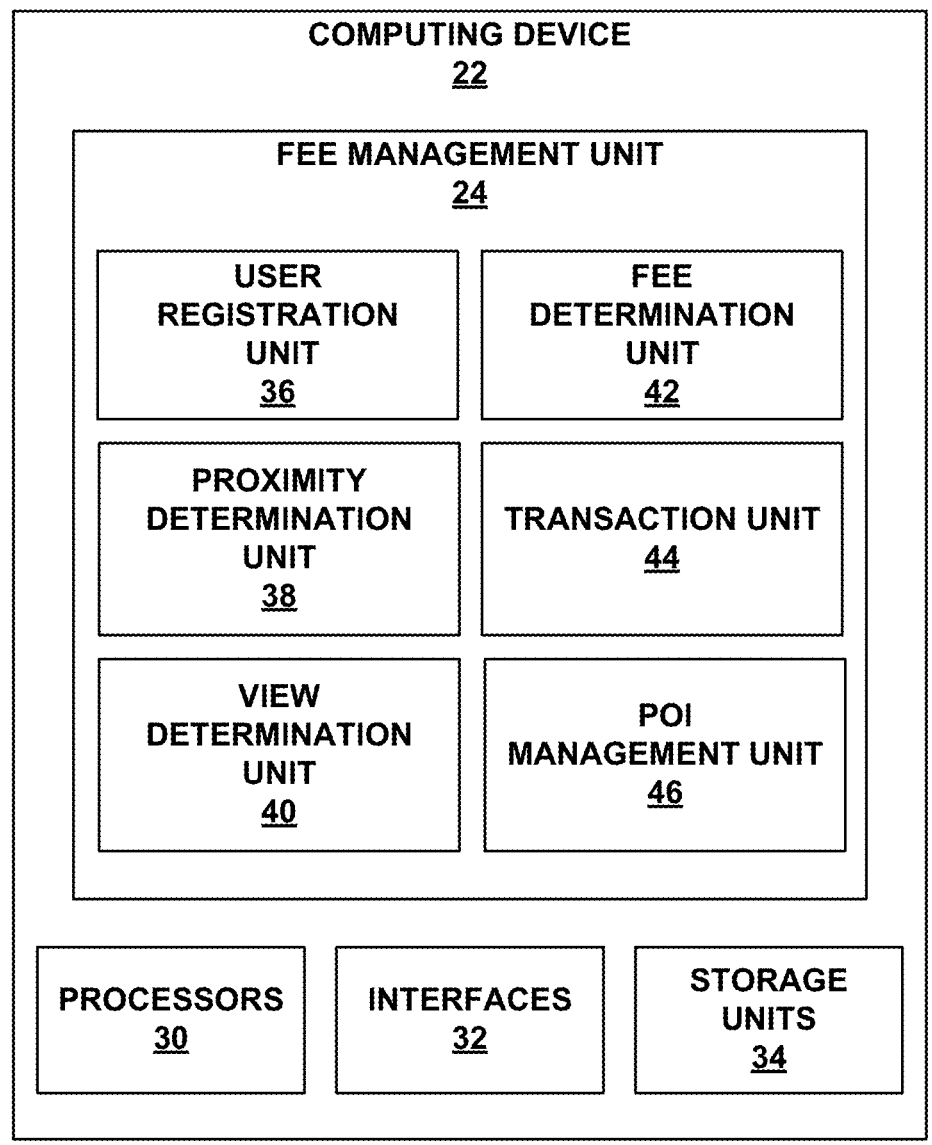
FIG. 2 is a block diagram illustrating the computing device of FIG. 1 in greater detail.

FIG. 2 is a block diagram illustrating the computing device of FIG. 1 in greater detail. The example of FIG. 2 includes fee management unit 24, one or more processors 30, one or more storage units 32, and one or more storage units 34. Fee management unit 24 includes user registration unit 36, proximity determination unit 38, view determination unit 40, fee determination unit 42, transaction unit 44, and point of interest (POI) management unit 46. In other examples, computing device 22 may be configured in a variety of other ways having additional, fewer, or alternative components than those shown in FIG. 2. For example, while computing device 22 is illustrated in the example of FIG. 2 as a single computing device, in other examples computing device 22 may have multiple components, e.g., in a distributed computing environment.

Processors 30, in one example, are configured to implement functionality and/or process instructions for execution within computing device 22. For example, processors 30 may be capable of processing instructions stored by storage units 34. Processors 30 may include, for example, microprocessors, digital signal processors (DSPs), application specific integrated circuits (ASICs), field-programmable gate array (FPGAs), or equivalent discrete or integrated logic circuitry.

Computing device 22 may utilize interfaces 32 to communicate with external devices via one or more wired or wireless connections. Interfaces 32 may be network interfaces cards, universal serial bus (USB) interfaces, optical interfaces, or any other type of interfaces capable of sending and receiving information via TCP/IP. Examples of such network interfaces may include Ethernet, Wi-Fi, or Bluetooth radios.

Storage units 34 may store an operating system (not shown) that controls the operation of components of computing device 22. For example, the operating system may facilitate the communication of fee management unit 24 with processors 30, interfaces 32, and storage units 34. In some examples, storage units 34 are used to store program instructions for execution by processors 30. Storage units 34 may also be configured to store information within computing device 22 during operation. Storage units 34 may be used by software or applications (e.g., fee management unit 24) executed by processors 30 of computing device 22 to temporarily store information during program execution.

Storage units 34 may include a computer-readable storage medium or computer-readable storage device. In some examples, storage units 34 include one or more of a short-term memory or a long-term memory. Storage units 34 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

User registration unit 36, proximity determination unit 38, view determination unit 40, fee determination unit 42, transaction unit 44, and POI management unit 46 may each include any combination of hardware or instructions executed by one or more processors 30 of computing device 22 to perform the respective functions described herein. In some examples, these units may be stand-alone or integrated applications or services executed by processors 30 of computing device 22.

In operation, according to aspects of this disclosure, fee management unit 24 may determine a fee to be charged to user 12 based on proximity 30 of user 12 to point of interest 18. User registration unit 36 may be responsible for registering user 12 for assessing a fee to user 12. In some examples, user registration unit 36 may receive a request to register user 12. For example, upon entering environment 16, user 12 (via user device 14) may transmit a request for registration to computing device 22. In other examples, user registration unit 36 may transmit a request to register to any computing devices located in environment 16. For example, user registration unit 36 may identify that user device 14 is located in environment 16 based on wireless signals transmitted by user device 14. In this example, user registration unit 36 may transmit a request to register user device 14 upon identifying user device 14.

Registration may establish a user profile for user 12. In some examples, registration may include assigning a unique identifier to user device 14. Fee management unit 24 may use the identifier to identify and track the location of user device 14 as user 12 moves throughout environment 16. User registration unit 36 may also register a financial account associated with user 12, which may allow fee management unit 24 to automatically initiate an electronic transaction to settle fees accumulated by user 12. In some examples, user 12 may establish user-defined fee limit that indicates a maximum amount that user 12 is willing to pay for access or services.

Proximity determination unit 38 may determine proximity 30. In some examples, proximity determination unit 38 may determine proximity 30 by determining a location user device 14, determining a location of point of interest 18 and determining a distance between the location of user device 14 and point of interest 18. Proximity determination unit 38 may receive data that indicates the respective locations of user device 14 and point of interest 18. For example, proximity determination unit 38 may receive location data from user device 14, point of interest 18, and/or one or more of beacons 20 and determine a distance between the location of user device 14 and point of interest 18. In other examples, proximity determination unit 38 may receive data that directly indicates proximity 30, e.g., as calculated by another component such as user device 14, point of interest 18, and/or one or more of beacons 20. In such examples, proximity determination unit 38 may determine proximity 30 based on the received proximity data.

View determination unit 40 may determine a view of user 12 relative to point of interest 18. For example, view determination unit 40 may determine an angle at which user 12 is viewing point of interest 18. In an example for purposes of illustration, view determination unit 40 may determine that user 12 is directly viewing point of interest 18 when the head or eyes of user 12 are oriented directly toward point of interest 18, e.g., with zero degrees of angle between the orientation of the head or eyes of user 12 and point of interest 18. View determination unit 40 may determine that user 12 is viewing point of interest 18 at an angle (or not viewing point of interest 18 at all) when the head or eyes of user 12 are not oriented directly toward point of interest 18, e.g., when the head or eyes of user are turned away from point of interest 18 at a non-zero angle.

View determination unit 40 may receive data to determine a view of user 12 from a variety of sources. For example, view determination unit 40 may receive images from cameras positioned in environment that provide an indication of a head or eye position of user 12. In another example, view determination unit 40 may receive data from user device 12 (e.g., such as glasses another device capable of measuring head or eye position of user 12).

In some examples, view determination unit 40 may receive data that indicates an absolute viewing angle of user 12 and may determine the view of user 12 based on a known location and/or orientation of point of interest 18. For example, view determination unit 40 may receive data that indicates that user 12 is looking straight forward or at an angle to the right or left relative to the body of the user 12. View determination unit 40 may determine a viewing angle of user 12 based on the received data and a known location and/or orientation of point of interest 18. In other examples, view determination unit 40 may receive data that indicates a view of user 12 relative to point of interest 18, e.g., as calculated by another component such as user device 14, point of interest 18, and/or one or more of beacons 20.

Fee determination unit 42 may determine a fee based on the proximity determined by proximity determination unit 38 and/or the view determined by view determination unit 40. The fee may be variable based on the proximity of user 12 to point of interest 18 and/or the view of user 12 relative to point of interest 18. In some instances, fee determination unit 42 may determine a relatively larger fee as the distance between user 12 and point of interest 18 decreases and a relatively smaller fee as the distance between user 12 and point of interest 18 increases.

In some instances, fee determination unit 42 may determine an initial fee based on an initial proximity and determine an updated fee based on a change to proximity 30. For example, fee determination unit 42 may charge an initial fixed fee based on an initial proximity 30 (e.g., a fee of 30 dollars for a particular seat in a sports stadium). As described in greater detail below, user 12 may move closer or further from point of interest 18. Fee determination unit 42 may determine an additional charge (e.g., a difference between the initial fee and a higher fee) based on user 12 moving closer to point of interest 18 or a refund (e.g., a difference between the initial fee and a lower fee) based on user moving further from point of interest.

Additionally or alternatively, in some examples, fee determination unit 42 may determine the proximity-based fee based on the duration that user 12 maintains the proximity (e.g., a fee per unit of time spent in the proximity). As examples, fee determination unit 42 may accumulate the fee per-second, per-minute, per-hour, or the like. In such example, fee determination unit 42 may continue to accumulate the fee to be charged to user 12 based on proximity 30 for as long as user 12 maintains proximity 30. If the user 12 changes proximity 30 (e.g., user 12 moves nearer or further from point of interest 18), fee determination unit 42 may determine a new fee based on the new proximity 30. Fee determination unit 42 may continue to accumulate the fee to be charged to user 12 based on proximity, regardless of changes to the proximity.

Transaction unit 44 may initiate an electronic transaction based on the determined fee. For example, as noted above, user 12 may register a financial account of user 12 held by financial institution 26 with fee management service 24. The registration may establish a user profile for user 12. In this example, transaction unit 44 may initiate an electronic transaction to settle the determined fee using funds from the financial account of user. Transaction unit 44 may initiate the electronic transaction based on an event. For example, transaction unit 44 may automatically initiate the electronic transaction upon determining that proximity 30 is less than a predetermined threshold. In another example, transaction unit 44 may automatically initiate the electronic transaction upon determining that user 12 has exited environment 16. In still another example, transaction unit 44 may automatically initiate the electronic transaction upon the fee reaching a predetermined threshold amount, such as a user-defined fee limit.

POI management unit 46 may be responsible for managing aspects associated with point of interest 18, e.g., based on input received from an administrator of environment 16 (e.g., a venue operator). For example, POI management unit 46 to store locations of points of interest, which may be used by proximity determination unit 38 to determine the proximity of user 12 and/or view determination unit 40 to determine the view of user 12. POI management unit 46 may also set fee rules that may be used by fee determination unit 42 to determine the fee.

For example, POI management unit 46 may establish proximity-based fee rules that are used by fee determination unit 42 to determine a fee based on proximity 30. POI management unit 46 may additionally establish view-based fee rules that may be used by fee determination unit 42 to determine a fee based on proximity 30. POI management unit 46 may additionally establish time-based fee rules that may be used by fee determination unit 42 to determine a fee based on duration that user 12 spends in proximity 30 or holds a view. In general, the rules may establish the manner in which the fee varies with respect to proximity, view, or time. In this way, an administrator may use POI management unit 46 to establish fees for access to point of interest 18.

Figure 3:
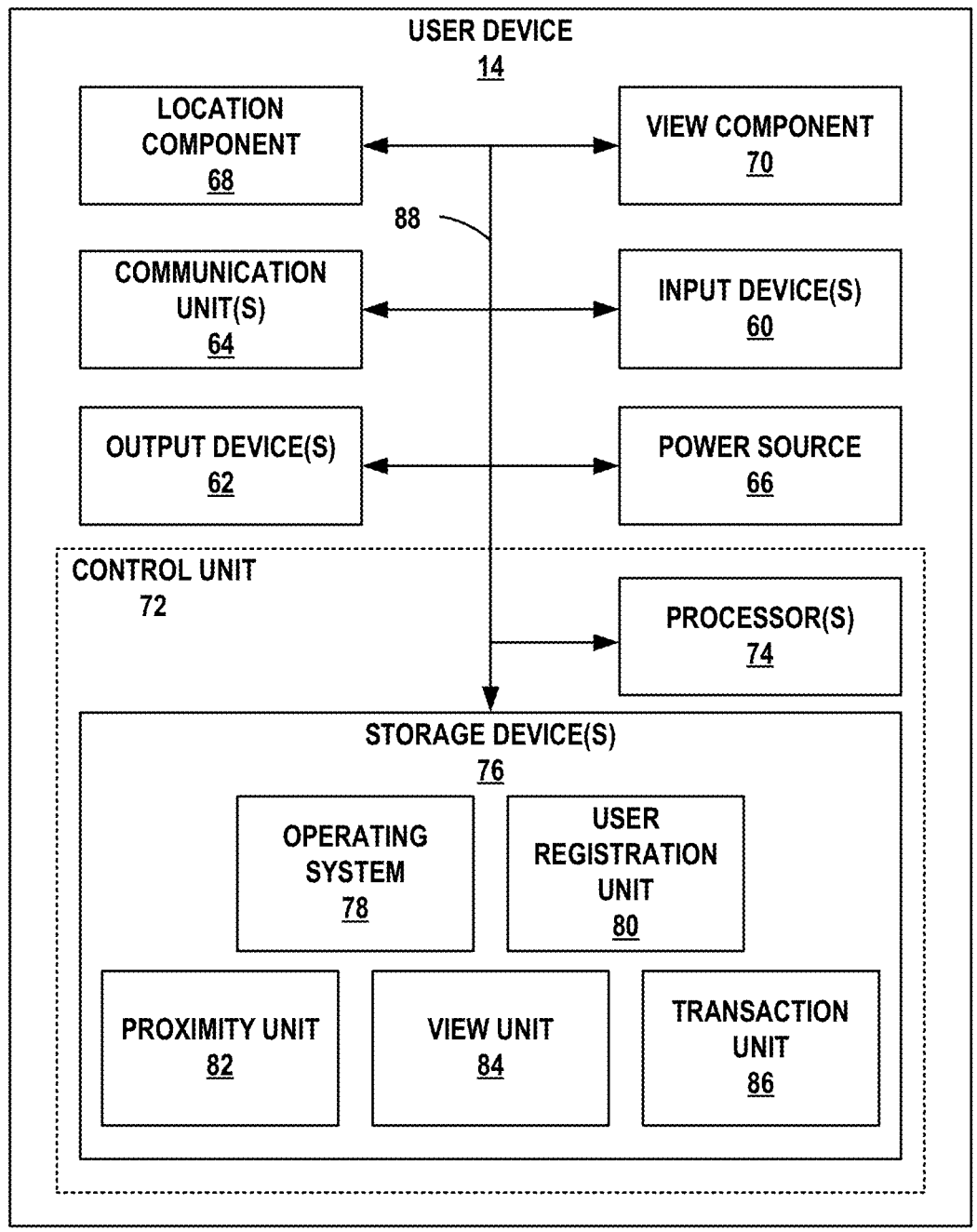
FIG. 3 is a block diagram illustrating the user device of FIG. 1 in greater detail.

FIG. 3 is a block diagram illustrating the user device of FIG. 1 in greater detail. The example of FIG. 3 includes input devices 60, output devices 62, communication units 64, power source 66, location component 68, view component 70, and control unit 72. Control unit 72 includes processors 74 and one or more storage devices 76 shown as storing operating system 78, user registration unit 80, proximity unit 82, view unit 84, and transaction unit 86. Communication channels 88 may interconnect one or more of the components described herein or shown in FIG. 2 for inter-component communications (physically, communicatively, and/or operatively). In some examples, communication channels 88 may include a system bus, a network connection, one or more inter-process communication data structures, or any other components for communicating data between hardware and/or software.

Input devices 60 may receive input, such as from a mouse or equivalent device, keyboard, voice responsive system, video camera, buttons, control pad, microphone or any other type of device for detecting input from a human or machine. Input devices 60 may also include one or more sensors, such as one or more accelerometers, gyrometers, light sensors, proximity sensors, temperature sensors, or the like.

Output devices 62 may generate, receive, or process output. Examples of output are tactile, audio, and video output. Output devices 62 of user device 12, in some examples, may include a presence-sensitive screen, sound card, video graphics adapter card, speaker, cathode ray tube (CRT) monitor, liquid crystal display (LCD), or any other type of device for generating output to a human or machine.

Output devices 62 may include display devices such as cathode ray tube (CRT) monitor, liquid crystal display (LCD), Light-Emitting Diode (LED) or any other type of device for generating tactile, audio, and/or visual output.

One or more communication units 64 may communicate with external devices by transmitting and/or receiving data. For example, user device 12 may use communication units 64 to transmit and/or receive radio signals on a radio network such as a cellular radio network. In some examples, communication units 64 may transmit and/or receive satellite signals on a satellite network such as a Global Positioning System (GPS) network. Examples of communication units 64 include a network interface card (e.g. such as an Ethernet card), an optical transceiver, a radio frequency transceiver, a GPS receiver, or any other type of device that can send and/or receive information. Other examples of communication units 64 may include Bluetooth®, GPS, 4G and Wi-Fi® radios found in mobile devices as well as Universal Serial Bus (USB) controllers and the like.

In some examples, power source 66 may be a battery. Power source 66 may provide power to one or more components of user device 12. Examples of power source 66 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 66 may have a limited capacity (e.g., 1000-3000 mAh).

Location component 68 may include hardware, software, or a combination of both hardware or software. For instance, location component 68 may include one or more location sensors capable of determining information about the location of user device 12. Location component 68 may include one or more GPS chips that uses satellite data to calculate a global position. In other examples, location component 68 may alternatively, or in addition, use information from cell towers, Wi-Fi networks, or other network information to triangulate location information or approximate location information. Location component 68 may output location information or indications of location information reflecting one or more locations at which user device 12 may be positioned or located.

View component 70 include hardware, software, or a combination of both hardware or software. For example, view component 70 may include one or more sensors capable of determining an orientation of a head or eyes of user 12. In an example for purposes of illustration, user device 14 may be worn on the head of the user (e.g., smart glasses) and view component 70 may include one or more position sensors and/or cameras to determine the orientation of the head or eyes of user 12 while being worn by user 12. In other examples, view component 70 may include any variety of other sensors (e.g., accelerometers, gyroscopes, or the like) that may provide an indication of an orientation of user device 14, which may be relevant to the orientation of the head or eyes of user 12.

Control unit 72 may store and execute the data and instructions of one or more applications, modules or other software. Although FIG. 3 illustrates control unit 72 as including one or more processors 74 and one or more storage devices 76, control unit 72 may include more or fewer components than shown in FIG. 3. For instance, control unit 72 may include one or more output devices, input devices, input/output ports or interface, sensors and/or communication units to name only a few examples. In other examples, control unit 72 may only include one processor. In general, control unit 72 provides an operating environment for one or one more units, such as user registration unit 80, proximity unit 82, view unit 84, and transaction unit 86.

One or more processors 74 may implement functionality and/or execute instructions within user device 14. For example, processors 74 may execute operating system 78 and receive and execute instructions stored by storage device 76 that provide the functionality of user registration unit 80, proximity unit 82, view unit 84, and transaction unit 86. These instructions executed by processors 74 may cause user device 14 to store and/or modify information within storage device 76 during program execution. Processors 74 may execute instructions of user registration unit 80, proximity unit 82, view unit 84, and transaction unit 86. That is, user registration unit 80, proximity unit 82, view unit 84, and transaction unit 86 may be operable by processors 74 to perform various functions described herein.

One or more storage devices 76 within user device 12 may store information for processing during operation of user device 14. In some examples, one or more storage devices 76 are temporary memories, meaning that a primary purpose of the one or more storage devices is not long-term storage. Storage devices 76 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 76, in some examples, also include one or more computer-readable storage media. Storage devices 76 may be configured to store larger amounts of information than volatile memory. Storage devices 76 may further be configured for long-term storage of information as non-volatile memory space and retain information after activate/off cycles. Examples of non-volatile memories include magnetic hard discs, optical discs, flash memories, or forms of electrically programmable memories (EPROM) or electrically erasable and programmable (EEPROM) memories. Storage devices 76 may store program instructions and/or data associated with user registration unit 80, proximity unit 82, view unit 84, and transaction unit 86.

In some examples, user registration unit 80, proximity unit 82, view unit 84, and transaction unit 86 may be one or more stand-alone applications or services executing at user device 14 by processors 74. For example, user registration unit 80, proximity unit 82, view unit 84, and transaction unit 86 may be included an application distributed by an administrator of environment 16 or another third-party. In this example, user device 14 may download and install the application from an application repository of a service provider (e.g., via the Internet). In other examples, user registration unit 80, proximity unit 82, view unit 84, and transaction unit 86 may be sub-components of operating system 78 controlling operation of user device 14. In such examples, user registration unit 80, proximity unit 82, view unit 84, and transaction unit 86 may be preloaded as part of operating system 78 of user device 14.

User registration unit 80 may be responsible for registering user 12 for assessing a fee to user 12. For example, user registration unit 80 may generate a request to register user 12 and/or user device 14 with user registration unit 36 (FIG. 2). The request may include information that identifies user device 14 as well as information that identifies user 12. In some examples, user registration unit 80 may interface with one or more third-party applications (e.g., social media applications or the like) executed by processors 74 of user device 14 in order to gather information that identifies user 12 for registration.

Proximity unit 82 may leverage location component 68 to generate data that indicates a location of user device 14. For example, proximity unit 82 may generate data that indicates an absolute location of user device 14, e.g., within environment 16. In such examples, another component (e.g., such as proximity determination unit 38 (FIG. 2) may be responsible for determining the proximity of user 12 to point of interest 18. In other examples, proximity unit 82 may be responsible for determining the location of user device 14, determining a location of point of interest 18 (e.g., based on data from point of interest 18, beacons 20, or computing device 22) and generating data that indicates the proximity of user 12 to point of interest 18.

View unit 84 may leverage view component 70 to generate data that indicates an absolute viewing angle of user 12. For example, view unit 84 may generate data that indicates that user 12 is looking straight forward or at an angle to the right or left relative to the body of the user 12. In such examples, another component (e.g., such as view determination unit 40 (FIG. 2) may be responsible for determining the view of user 12 relative to point of interest 18. In other examples, view unit 84 may be responsible for determining a location and/or orientation of point of interest 18 (e.g., based on data from point of interest 18, beacons 20, or computing device 22) and generating data that indicates the view of user 12 relative to point of interest 18.

Transaction unit 86 may determine or receive (e.g., from fee determination unit 42 (FIG. 2)) an indication of a determined fee and may execute a transaction using a financial account of user 12 (e.g., as established during registration) to settle the fee. Transaction unit 86 may execute the transaction based on a user profile that includes information that identifies user 12, information specifying the financial account of user 12, user-defined fee limits, and/or other information or preferences. In some instances, transaction unit 86 may be included in or accessed by a mobile banking application, e.g., associated with financial institution 26 (FIG. 1).

Figure 4:
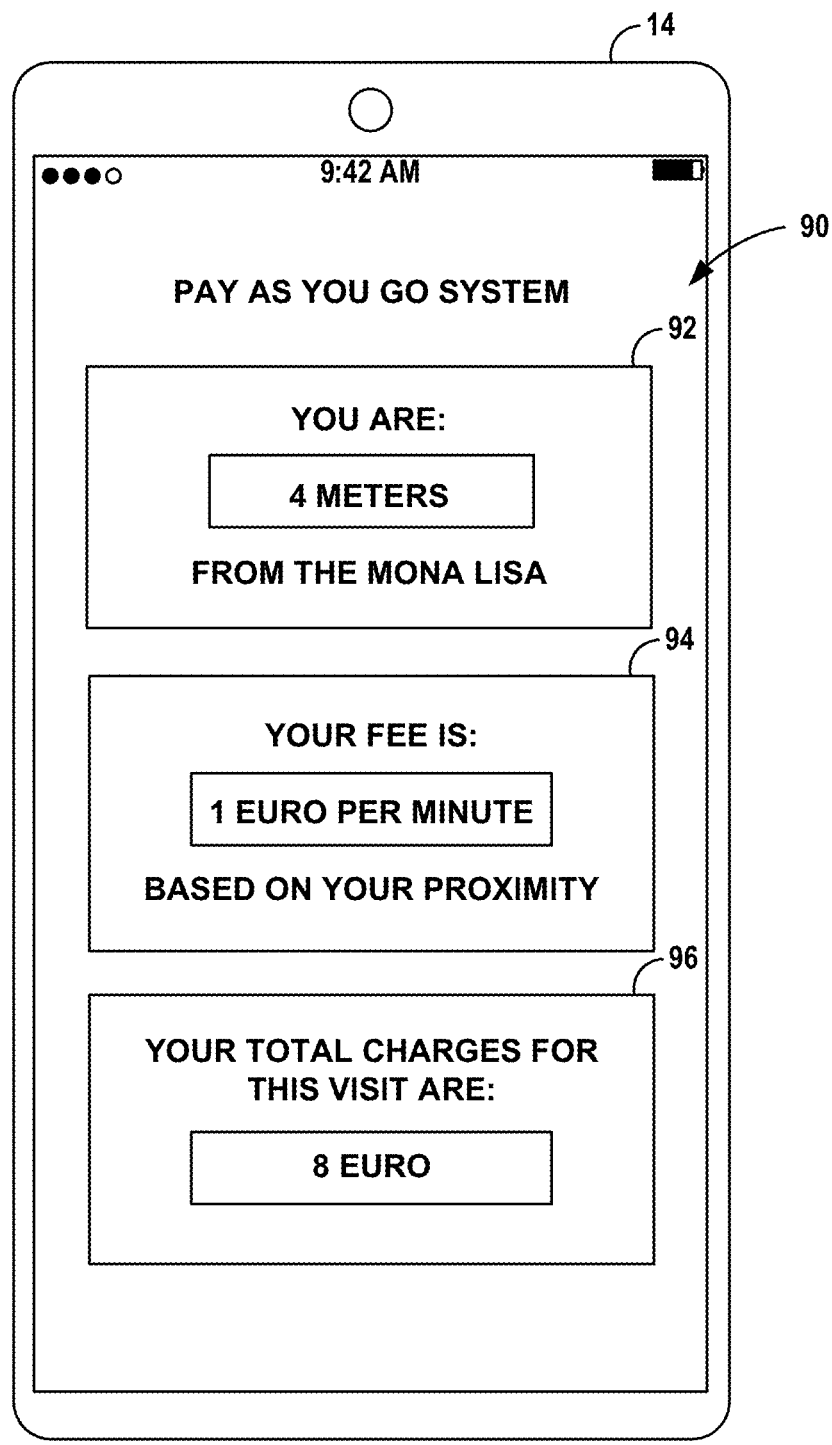
FIG. 4 is a conceptual diagram illustrating a graphical user interface of an example mobile device that may present an example proximity-based fee in accordance with one or more aspects of the present disclosure.

FIG. 4 is a conceptual diagram illustrating a graphical user interface (GUI) 90 of an example mobile device, such as user device 14, that may present an example proximity-based fee in accordance with one or more aspects of the present disclosure. The example GUI 90 shown in FIG. 4 includes proximity indicator 92, rate indicator 94, and fee indicator 96. In other examples, GUI 90 may present additional, less or different graphical content than that shown. For example, GUI 90 may also include a view indictor that provides an indication regarding whether user 12 is viewing point of interest 18 or a determined angle at which user 12 is viewing point of interest 18.

GUI 90 may be generated by an application executed by processors 74 and output by output devices 62. Proximity indicator 92 indicates a proximity of user 12 to point of interest 18 (e.g., in the illustrated example point of interest 18 is the Mona Lisa painting). Rate indicator 94 indicates a fee that is to be charged to user 12. Rate indicator 94 may indicate a static fee or a fee charged per unit of time. Fee indictor 96 illustrates a total accumulated fee.

In the example of a gallery having paintings such as the Mona Lisa for purposes of illustration, to determine the fee, an administrator of the gallery may access a computing device for administering the system (e.g., such as computing device 22) via a web page or a mobile application. The administrator may assign a unique identifier for each beacon (such as beacons 20 (FIG. 1)) located near particular paintings of interest, either via the mobile application or the web app. The administrator may also create one or more rules for each of the beacons. The rules may include, as examples, one or more rules to charge fees based on an amount of time that the customer is located within the proximity of one of the beacons, rules to charge fees based on the distance between the customer and one of the beacons (e.g., different fees by proximity), or rules to charge fees based on the number of other people in the same vicinity. For example, in some instances, the administrator may define rules that charge a higher fee in a less crowded location and a lower fee as the area gets more crowded. As another example, the administrator may define rules that charge a lower fee for a low and a high crowd, but a higher fee for a "perfect" number of people.

In some examples, as described herein, the administrator may also define rules for charging fees based on views. For example, the gallery may include additional sensors or cameras that determine the direction in which the customer is looking relative to the point of interest, e.g., the Mona Lisa. For example, the administrator may position eye tracking cameras at or near the points of interest. Sensors for determining the view of the customer may additionally or alternatively be incorporated in a computing device held or worn by the customer such as smart glasses or augmented reality glasses. The rules may be defined to only charge a fee to the customer when the sensors indicate that the customer is viewing the point of interest and stop charging the fee when the customer looks away. In this way, aspects of this disclosure include determining a set of fee charging rules based on proximity and/or views.

In operation, as the customer nears the entrance of the gallery, the customer may receive a prompt to download and install an application for the gallery that is responsible for managing fees and interconnecting the application with the customer's mobile wallet. In some examples, the customer also connects augmented reality glasses to the system in order to perform head/eye tracking of the customer. The customer may be informed via GUI 90 that the gallery is a pay as you go system that allows the customer to freely move throughout the gallery and look at any pieces that the customer prefers. The customer is also informed of the rules set by the gallery and that the customer will be charged a micro fee for being located within a particular proximity to points of interest or for specific views of points of interest.

As the customer moves around the gallery viewing works of art (points of interest), the system detects that a customer is within a proximity of a point of interest and begins to accrue a fee for the time spent near the point of interest. In addition, the customer may trigger rules for viewing the point of interest or any other rules as defined by the administrator. The customer may accrue fees for a number of different points of interest. When the customer leaves the gallery, the number and duration of views is tallied and the customer is billed.

Figure 5:
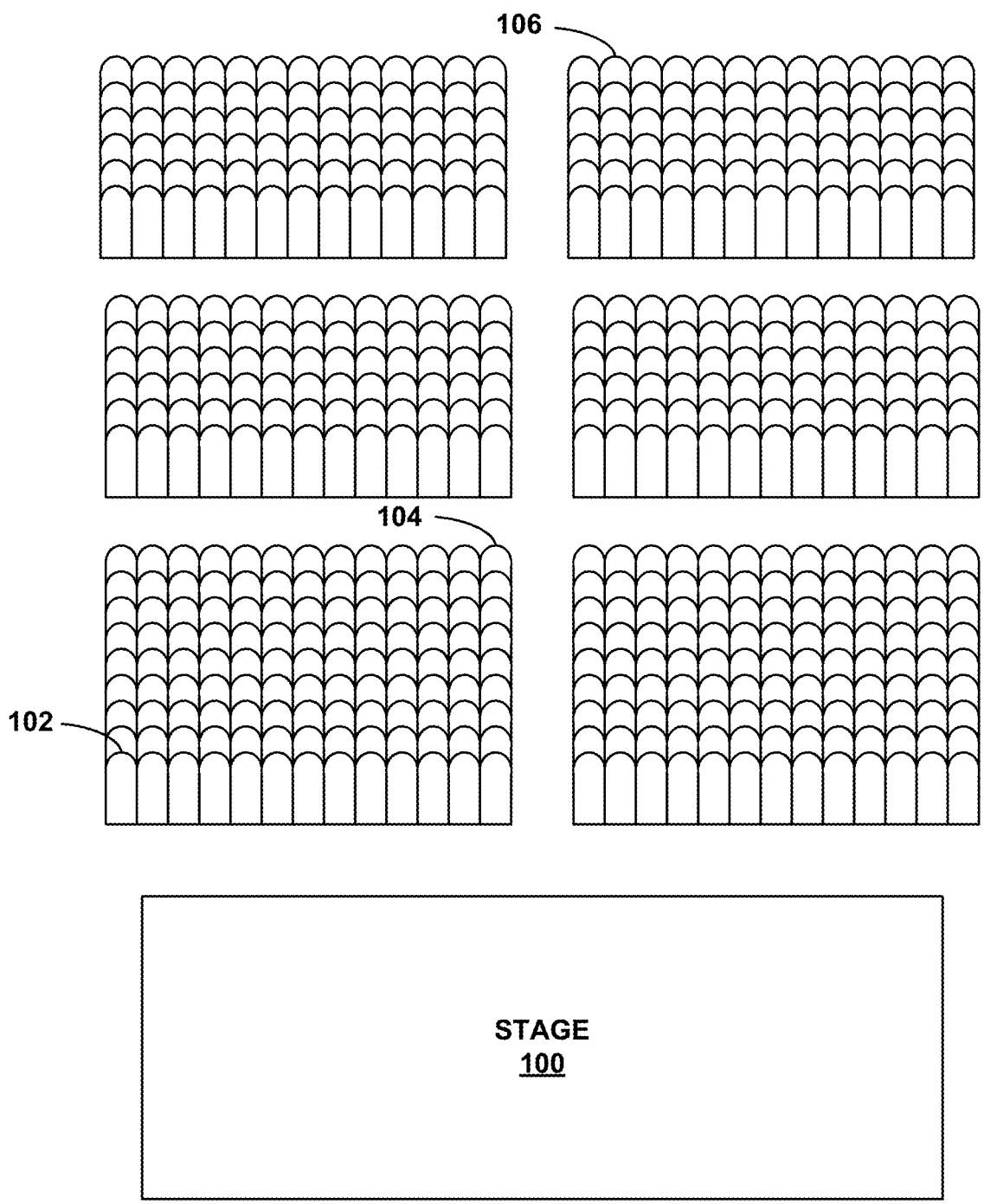
FIG. 5 is a conceptual diagram illustrating an example venue in which a proximity-based fee is determined in accordance with one or more aspects of the present disclosure.

FIG. 5 is a conceptual diagram illustrating an example proximity-based fee determination in accordance with one or more aspects of the present disclosure. The example of FIG. 5 generally illustrates a concert hall having a stage 100 and a plurality of seats, including seat 102, seat 104, and seat 106. While the example of FIG. 5 is described with respect to computing system 10 for purposes of illustration, the techniques may be applicable to a variety of other computing systems.

According to aspects of this disclosure, fee management unit 24 may determine a fee that is higher for seat 102 than for seat 104 and a fee that is higher for seat 104 than seat 106. That is, fee management unit 24 may charge user 12 more for being seated closer to stage 100 and less for being seated further from stage 100. Fee management unit 24 may also charge different fees for seats 102, 104, and 106, as the viewing angles of the seats relative to stage 100 are different for the respective seats. In this example, fee management unit 24 may notify user 12 the incremental price differences between seats 102, 104, and 106 (e.g., via GUI 90 displayed by user device 14).

In the system described above, there is no need to issue tickets in advance of the show. Rather, customers (including user 12) locate seats upon entering the concert hall. After a predetermined time of inactivity at a particular seat (e.g., one minute) user 12 is notified of the price for that particular seat. If user 12 does not move from that seat, user 12 is charged the seat price. If user 12 moves to a seat nearer stage 100, user 12 is charged an additional incremental amount. If user 12 moves to a seat further from stage 100, user 12 is refunded an incremental amount.

Figure 6:
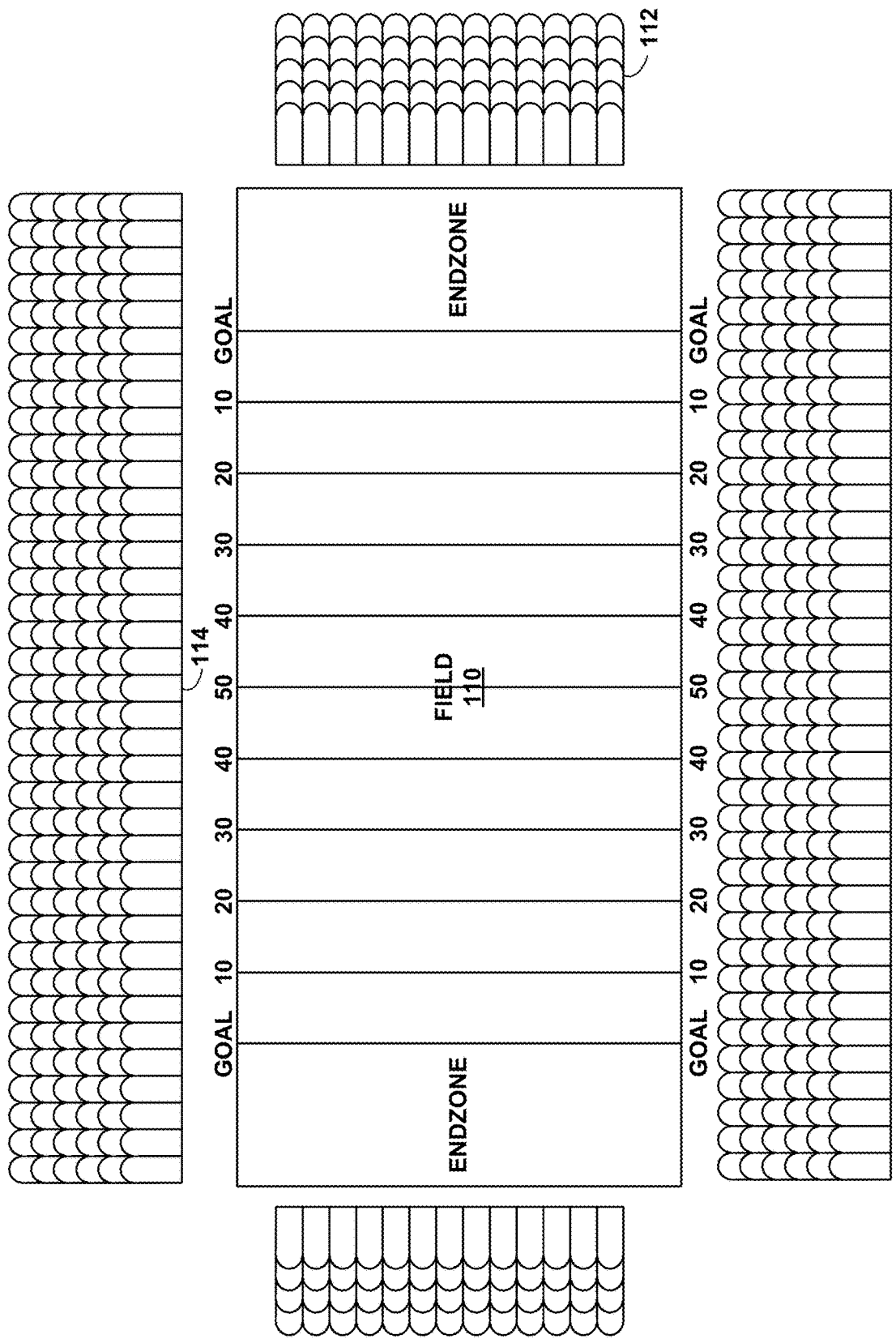
FIG. 6 is a conceptual diagram illustrating another example venue in which a proximity-based fee is determined in accordance with one or more aspects of the present disclosure.

FIG. 6 is a conceptual diagram illustrating another example proximity-based feed determination in accordance with one or more aspects of the present disclosure. The example of FIG. 6 generally illustrates a football field 110 and a plurality of seats, including seat 112 and seat 114. While the example of FIG. 6 is described with respect to computing system 10 for purposes of illustration, the techniques may be applicable to a variety of other computing systems.

According to aspects of this disclosure, fee management unit 24 may determine a fee that is lower for seat 112 than for seat 114. That is, fee management unit 24 may charge user 12 relatively less for being seated further from filed 110. In addition, fee management unit 24 may charge user 12 relatively less for viewing filed 110 at an angle (e.g., relative to the 50 yard line).

Again, in the system described above, there is no need to issue tickets in advance of the game. Rather, as customers (including user 12) move to different seats fee management unit 24 may notify user 12 the incremental price differences between seats. After a predetermined time of inactivity at a particular seat (e.g., one minute) user 12 is notified of the price for that particular seat. Seats with better views may command higher fees than other seats with views that are not as good.

In some examples, with respect to the example of a sporting event, each team may wish to charge a different fee based on the customers preferred team. The preferred team may be determined by tracking the head and eyes of the customer during the first few minutes of the game. This initial calibration period may determine the customer's team allegiance, which may be associated with a higher fee, lower fee or discounts.

Figure 7:
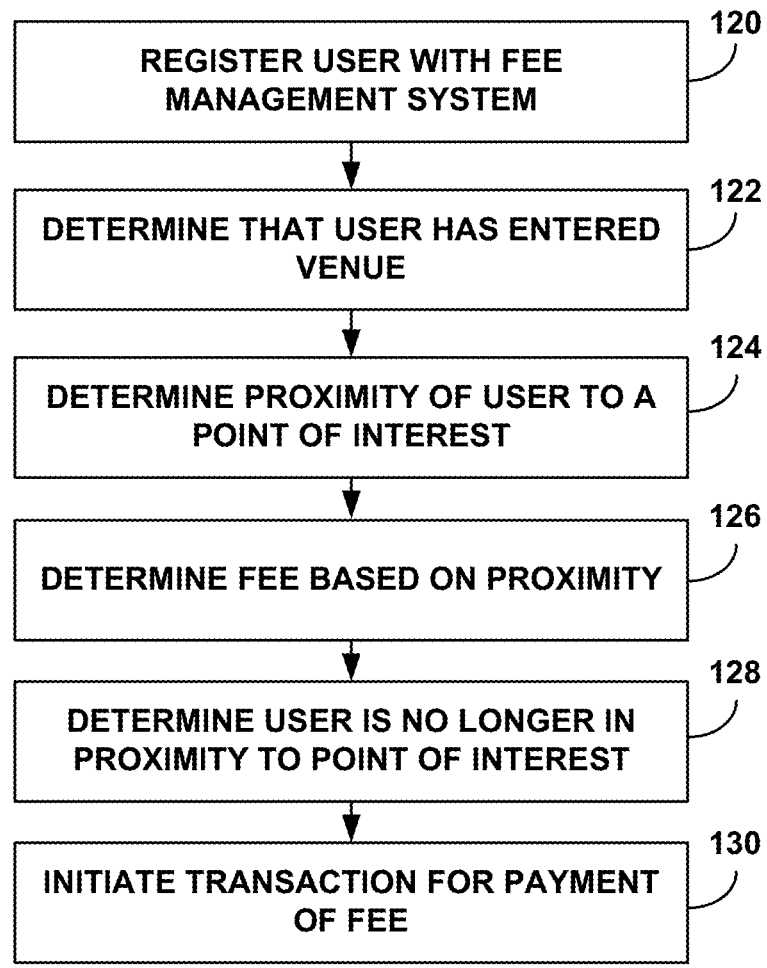
FIG. 7 is a flow diagram illustrating a process for determining a fee based on a proximity to a point of interest in accordance with one or more aspects of the present disclosure.

FIG. 7 is a flow diagram illustrating a process for determining a fee based on a proximity to a point of interest in accordance with one or more aspects of the present disclosure. While the example of FIG. 7 is described with respect to computing system 10 for purposes of illustration, the techniques may be applicable to a variety of other computing devices or systems.

In the example of FIG. 7, fee management unit 24 may register user 12 (and user device 14) with the fee management system provided by computing system 10 (120). For example, user 12 may register user device 14 with fee management service 24, so that fee management service 24 is able to identify user device 14 as user 12 moves within environment 16. User 12 may also provide information that identifies user 12 as well as financial account data for settling assessed fees.

Fee management unit 24 may determine that user 12 has entered a venue, such as environment 16 (122). Fee management unit 24 may determine proximity 30 of user device 14 to point of interest 18 while user 12 remains in environment 16 (124). Fee management unit 24 may determine proximity throughout the time during which user 12 remains in environment, or at various intervals (e.g., every 30 seconds, every minute, every five minutes, or the like). As described herein, fee management unit 24 may determine proximity 30 based on a difference in location between user 12 (and user device 14) and point of interest 18.

Fee management unit 24 may determine a fee based on the determined proximity (126). For example, as described herein, fee management unit 24 may determine a relatively larger fee as proximity 30 of user 12 to point of interest 18 increases. Likewise, fee management unit 24 may determine a relatively smaller fee as proximity 30 of user 12 to point of interest 18 decreases. In some examples, fee management unit 24 may determine the proximity-based fee as a function of time. For example, fee management unit 24 may determine a fee per-second, per-minute, per-hour, or the like. In some instances, fee management unit 24 may also determine the fee based on a determined view of user 12 with respect to point of interest 18.

Fee management unit 24 may determine that user 12 is no longer in proximity to point of interest 18 (128). For example, fee management unit 24 may determine that user 12 is a predetermined distance from point of interest 18, or that user 12 has moved outside of environment 16. In such examples, fee management unit 24 may stop accruing the fee for user (e.g., in instances in which the fee is time-based).

Fee management unit 24 initiates an electronic transaction for payment of the determined fee (130). For example, as noted above, user 12 may register a financial account of user 12 held by financial institution 26 with fee management service 24. In this example, fee management unit 24 may initiate an electronic transaction to settle the determined fee using funds from the financial account of user 12. In some examples, fee management unit 24 initiates the electronic transaction based on a user profile associated with user 12, e.g., that includes information that identifies user 12, user preferences (e.g., such as user-specified fee limits), or the like.

In this way, the techniques may allow a fee to be assessed to a customer of a variety of different venues. For example, in an art gallery, the system may be used to allow customers to pay per view specific artwork. A customer may pay nothing to enter the gallery. However, there may be different prices and fees based on the artist of the work and the rarity of the work. Higher prices may be charged for longer, closer views of the work. Customers may be charged based on proximity to the work or based on viewing the work, both of which may be time based.

In a concert hall, a customer may sit in a pre-purchased seat or move to a new (unoccupied) seat. If the customer moves to a more expensive seat and stays there, the system determines a higher fee after a certain period of time spent in the new seat.

At a dance club, the system may determine a fee for a customer located at the back of the dance club that is relatively lower than a fee for a customer located at the front of the club. The system may determine a fee that is higher for customers on the dance floor, unless the dance floor gets too crowded, then the fee is reduced. The club owner may determine generally where people tend to congregate within the club and assess varying fees to help to spread out the crowds. In some examples, the techniques of this disclosure include gathering location data from customers within the club and using the location data to determine customer density (e.g., how close customers are positioned with respect to one another). Such location data may be gathered using beacons (such as beacons 20 (FIG. 1)). Gathering location data from devices carried or worn by the customers (e.g., such as mobile phones) may provide a relatively accurate indication of density. The club owner may then rebalance the crowd by offering discounts or promotions and sending such offers to a device carried or worn by the customer and directing the customer to move a less crowded location.

At an ad hoc outdoor car show, as the cars are judged prior to the show, the show administrator may place beacons on all of the cars. The administrators may determine fee rules based on how the cars placed during the competition. For example, a fee may be higher for visiting the first place car relative to the second place car, and so on.

In an example involving vending machines, a customer may walks past a vending machine. The vending machine senses that the customer is passing, based on a customer profile (e.g., that past purchases or preferences of the customer acquired by communicating with a computing device carried or worn by the customer) and displays a message on the vending machine that is specific to the customer. After the customer arrives in front of the machine, the machine may prepare to dispense a product based on the customer's preferences. The vending machine may prompt the customer to view a video in order to receive the product at a discounted price. If the customer views the video and the augmented reality glasses or remote head/eye tracking cameras on the user device determines that the customer has watched the video, the vending machine may apply the discount to the product. The fee for the product may be charged directly to the customer's mobile wallet.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computer-implemented method comprising:
monitoring, by a computing device communicatively coupled to a plurality of wireless beacons positioned around an environment, a distance of a user device within the environment to a point of interest at two or more points in time within the environment based on a triangulation of signal data received from the user device by the wireless beacons and a location of the point of interest;
monitoring, by the computing device, an angle of a head or eyes of a user of the user device with respect to the point of interest based on position sensor data specifying an orientation of the head of the user received from the user device;
determining, by the computing device, first characteristics of the user device comprising a first distance of the user device to the point of interest, a first angle of the head or eyes of the user, and a first duration of time that the first distance is maintained while the user is viewing the point of interest;
determining, by the computing device, second characteristics of the user device comprising a second distance of the user device to the point of interest, different than the first distance, a second angle of the head or eyes of the user, and a second duration of time that the second distance is maintained while the user is viewing the point of interest;
determining, by the computing device, an accumulated fee including a first fee based on the first characteristics and a second fee based on the second characteristics, the second fee being different than the first fee; and
initiating, by the computing device, an electronic transaction to settle the accumulated fee.

2. The method of claim 1, wherein one of the wireless beacons is positioned at the point of interest.

3. The method of claim 2, wherein monitoring the distance comprises determining the distance based on wireless communication between the user device and the wireless beacon positioned at the point of interest at the two or more points in time.

4. The method of claim 1, wherein determining the accumulated fee comprises preventing further increasing of the accumulated fee based on one of the first or second distances exceeding a distance threshold.

5. The method of claim 1, further comprising determining, by the computing device, third characteristics of the user device comprising a third distance of the user device to the point of interest and a third duration of time that the third distance is maintained;
wherein determining, by the computing device, the accumulated fee includes adding the first fee, the second fee, and a third fee based on the third characteristics.

6. The method of claim 1, further comprising:
generating an electronic message that indicates the accumulated fee; and
transmitting the electronic message that indicates the accumulated fee to the user device.

7. The method of claim 6, further comprising:
generating a second electronic message that indicates a change to the accumulated fee;
transmitting the electronic message that indicates the change to the accumulated fee to the user device.

8. The method of claim 1, further comprising:
after initiating the electronic transaction, generating an electronic message that indicates the electronic transaction; and
transmitting the electronic message to the user device.

9. The method of claim 1, wherein the environment is a venue, the method further comprising determining that the user device has exited the venue, and wherein initiating the electronic transaction comprises automatically initiating the electronic transaction based on the determination that the user device has exited the venue.

10. The method of claim 1, further comprising:
receiving an indication of a user-defined fee limit;
wherein initiating the electronic transaction comprises automatically initiating the electronic transaction based on the accumulated fee being equal to the user-defined fee limit.

11. The method of claim 1, wherein the environment is a venue, and wherein determining the first fee and the second fee further comprises determining the first fee and the second fee based on a number of people present at the venue.

12. A system comprising:
a memory configured to store a user profile for a user; and
one or more processors configured to:
monitor a distance of a user device within an environment to a point of interest within the environment based on a triangulation of signal data received from the user device by wireless beacons positioned around the environment and a location of the point of interest at two or more points in time;
determine an angle of a head or eyes of a user of the user device with respect to the point of interest based on position sensor data specifying an orientation of a head received from the user device;
determine first characteristics comprising a first distance of the user device to the point of interest, a first angle of the head or eyes of the user, and a first duration of time that the first distance is maintained while the user is viewing the point of interest;
determine second characteristics comprising a second distance of the user device to the point of interest, different than the first distance, a second angle of the head or eyes of the user, and a second duration of time that the second distance is maintained while the user is viewing the point of interest;
determine an accumulated fee including a first fee based on the first characteristics and a second fee based on the second characteristics, the second fee being different than the first fee; and
initiate an electronic transaction to settle the accumulated fee and according to the user profile.

13. The system of claim 12, wherein to determine the accumulated fee, the one or more processors are configured to prevent further increasing of the accumulated fee based on one of the first or second distances exceeding a distance threshold.

14. The system of claim 12, wherein the environment is a venue, and wherein the one or more processors are further configured to determine that the user device has exited the venue, and wherein to initiate the electronic transaction, the one or more processors are configured to automatically initiate the electronic transaction based on the determination that the user device has exited the venue.

15. The system of claim 12, wherein the environment is a venue, and wherein to determine the first fee and the second fee, the one or more processors are further configured to determine the first fee and the second fee based on a number of people present at the venue.

16. A non-transitory computer-readable medium having instructions stored thereon that, when executed, cause one or more processors to:
monitor a distance of a user device within an environment to a point of interest within the environment based on a triangulation of signal data received from the user device by wireless beacons positioned around the environment and a location of the point of interest at two or more points in time;
determine an angle of a head or eyes of a user of the user device with respect to the point of interest based on position sensor data specifying an orientation of the head received from the user device;
determine first characteristics comprising a first distance of the user device to the point of interest, a first angle of the head or eyes of the user, and a first duration of time that the first distance is maintained while the user is viewing the point of interest;
determine second characteristics comprising a second distance of the user device to the point of interest, different than the first distance, a second angle of the head or eyes of the user, and a second duration of time that the second distance is maintained while the user is viewing the point of interest;
determine an accumulated fee including a first fee based on the first characteristics and a second fee based on the second characteristics, the second fee being different than the first fee; and
initiate an electronic transaction to settle the accumulated fee and according to the user profile.

* * * * *